United States Patent Office 3,533,733
Patented Oct. 13, 1970

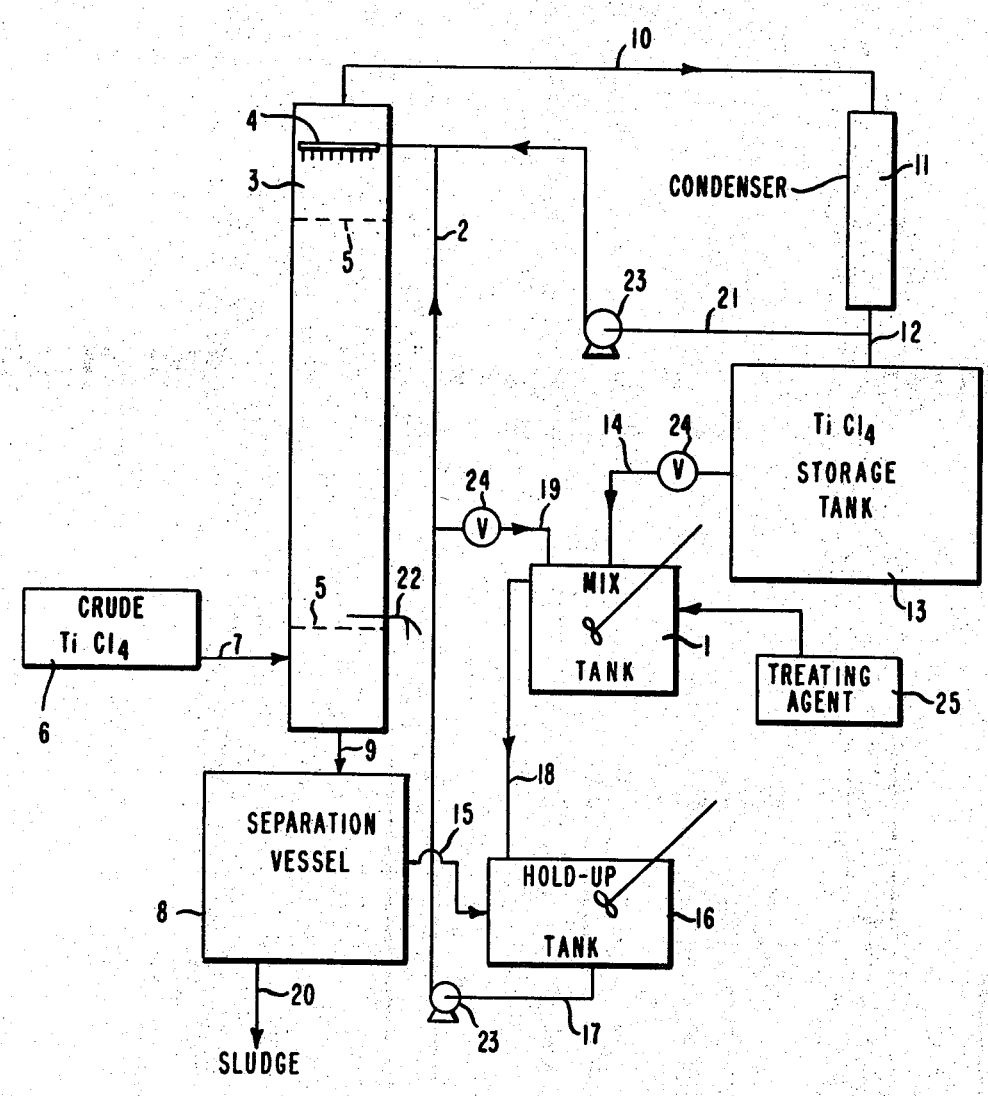

3,533,733
PURIFYING CRUDE TiCl₄ VAPOR
Harold B. Clark and Kenneth M. Kolb, Wilmington, Del., assignors to E. I. du Pont de Nemours and Company, Wilmington, Del., a corporation of Delaware
Continuation-in-part of application Ser. No. 426,059, Jan. 18, 1965. This application May 9, 1968, Ser. No. 727,816
Int. Cl. C01g 23/02
U.S. Cl. 23—87                    5 Claims

ABSTRACT OF THE DISCLOSURE

Titanium tetrachloride, containing vanadium as in impurity, is purified by making intimate contact between the impure tetrachloride in the vapor state with an organic treating agent in the liquid state. This contact is made in the contact zone of a vertically disposed column at the vapor-liquid equilibrium temperature by passing ascending impure vapor counter-currently in contact with descending organic treating agent in liquid form, preferably in liquid titanium tetrachloride. The equilibrium temperature is established and maintained in the contact zone by heat derived from the impure tetrachloride vapor. The heat content of the vapor, including superheat, preferably is regulated depending on the temperature and relative quantity of incoming liquid phase and the heat loss characteristics of the contacting apparatus, so that condensation of titanium tetrachloride vapor or evaporation from the treating liquid is minimized. The vanadium in the impure tetrachloride vapor is fixed as a non-volatile residue by the agent and removed from below the contact zone while pure tetrachloride vapor is removed from above the contact zone.

CROSS REFERENCES

This application is a continuation-in-part of application Ser. No. 635,009, filed May 1, 1967, which in turn is a continuation-in-part of Ser. No. 426,059, filed Jan. 18, 1965, and both now abandoned.

BACKGROUND OF THE INVENTION

Titanium tetrachloride is a useful intermediate employed in various processes demanding high purity, as in the manufacture of titanium metal, titanium dioxide pigments, and other titanium compounds. Prior to such employment, the titanium tetrachloride must be subjected to purification treatment to free it of impurities carried over into the product during its manufacture. Thus, in preparing the compound through chlorination in the presence of a carbonaceous reducing agent of titanium-bearing materials such as ilmenite and rutile ores, or waste slag from ilmenite iron recovery operations, the crude TiCl₄ usually has a deep yellow color due to the presence of other chlorides, particularly of iron and vanadium carried over during the chlorination of the titanium values. In the usual chlorination, the finely ground ore is mixed with a powdered carbonaceous reducing agent, such as coke and is chlorinated, either in a fluidized bed or in a fixed bed of briquettes at temperatures between 500 and 1400° C. and usually in the range of from 800° C. to 1100° C.

The hot gases from the chlorination consisting of mixtures of TiCl₄ with chlorides of the other metals mentioned are cooled and purified in accordance with known procedures to effect iron chloride, aluminum chloride and other high boiling chloride removal. After removal of the high boiling solid chlorides, condensation of the TiCl₄ is undertaken in conventional water-cooled or contact condensers. The crude liquid TiCl₄ produced from such condensation must be subjected to a further purification for removal of objectionable high boiling residual chlorides as well as the near and low boiling chlorides of vanadium, silicon, tin, arsenic and sulfur. Of these, vanadium is especially deleterious if present during TiO₂ pigment manufacture and is one of the most difficult of impurities to remove from TiCl₄. Normally, this impurity is present to the extent of 200 to 4000 parts per million. To be useful in TiO₂ pigment production, the TiCl₄ intermediate must contain less than 10 parts per million vanadium and, preferably, should be less than 5 parts per million.

Distillation comprises a preferred technique for purification since TiCl₄ boils at about 136.4° C. at atmospheric pressure. Impurities such as iron chlorides and aluminum oxychlorides having much higher boiling points than TiCl₄ can be easily removed by this technique. Since vanadium is normally present as VOCl₃ or VCl₄, both of which boil at about the same temperature as TiCl₄, distillation without the use of other aids is not a practical method of purification. Previously, vanadium impurity removal has been effected by converting the impurity to a relatively non-volatile form by means of organic treating agents which react with the VOCl₃ or VCl₄ to form non-volatile complex vanadium derivatives and then vaporizing pure TiCl₄. Organic materials utilized for this purpose include animal and vegetable oils, e.g., tall oil, and waxes, and hydrolyzed and saponified derivatives, such as fatty acids, fatty alcohols and soaps, petroleum fractions, such as lubricating oil, mineral oil and heavy residual fractions, such as Bunker "C" oil; predominantly hydrocarbon manufactured materials, and predominantly hydrocarbon polymers such as polyethylene and polypropylene. In such treatment the organic reagent or mixture is incorporated into the crude TiCl₄ liquid and the resulting solution is added to a heat exchanger vaporizer for distillation.

Unfortunately, these organic metal-complexing agents, tend to polymerize at elevated temperatures in the presence of TiCl₄, especially when other contaminating metals are present. This polymerization occurs to a large extent on the hot surfaces employed to boil the TiCl₄ in the still. As a result, the polymer sludge adheres to and fouls such heating surfaces, drastically reducing the heat transfer capacity and in relatively short periods requiring expensive equipment outage for cleaning and repair.

SUMMARY OF THE DISCLOSURE

The present invention provides a process for removing vanadium contaminants from vaporized TiCl₄ without equipment fouling by subjecting crude TiCl₄ while in the vapor state to a scrubbing and reaction treatment with a solution or finely divided suspension in TiCl₄ of an organic treating agent having an affinity for vanadium (preferably from 0.03 to 10% by weight) in a vertically disposed column having a product recovery zone at its upper extremity, a contaminant removal zone at its lower extremity and a liquid-vapor contact zone therebetween, while the temperature of the contact zone is maintained at the vapor-liquid equilibrium temperature solely by means of heat derived from the crude TiCl₄ vapor and liquid; the crude TiCl₄ vapor is fed into the lower end of the column and ascends through the contact zone while the liquid which contains organic treating agent (preferably soap) is fed into the upper end of the column and descends through the contact zone. Contaminant is collected and removed from the lower end of the column below the contact zone while pure TiCl₄ is collected and recovered from the upper end of the column above the contact zone after which it is condensed to the pure, liquid TiCl₄ product.

In the practice of this invention, a liquid form of the treating agent is prepared, preferably by mixing the agent with liquid TiCl$_4$, either pure or crude. This liquid is then intimately contacted with hot crude titanium tetrachloride vapor either in batch or continuous manner. Superheat may be supplied to the vapor so that the contacting zone is raised to and maintained at the vapor-liquid equilibrium during the vapor purification procedure. The degree of superheat, the temperature of the liquid phase and the quantities of material involved are controlled so that the liquid phase does not disappear from the contacting zone. Replenishment of the treatment agent is made as it is consumed by reaction with the impurities. In the continuous operation the treating agent solution is preferably fed to the contacting zone at temperatures between about 90° C. and the operating equilibrium temperature. This liquid is preferably brought to this temperature range either by using hot tetrachloride for making up the preparation or by sparging the mixture with hot titanium tetrachloride vapor, superheated if desired. The hot titanium tetrachloride vapors may be obtained directly from a source such as chlorination furnace or from a partial condenser wherein iron chloride is separated. In either case the vapor can be above its boiling point. The desired heat content of the vapor may also be obtained by either liquid or gas phase superheaters, preferably the former, in which the crude tetrachloride is heated by known heat exchange means without difficulty since the organic treating agent is not present. The organic treating agents used are well known, but when the heating of their solutions is accomplished solely by the introduction of hot vapors, the problem of fouled surfaces is overcome.

DESCRIPTION OF THE DRAWING

The drawing is a schematic representation of the process of the present invention. In the process of the invention, and referring to the drawing, an organic treating agent solution (e.g., pure TiCl$_4$ liquid plus a laundry soap), supplied from treating agent source 25 and mixed in mix tank 1 is charged, via line 2 (after passing through hold-up tank 16 via lines 18 and 17), while preferably at temperatures ranging from about 90° C. to 130° C., to a vertically disposed tower 3 containing a sprayer 4 and if desired, suitable perforated, sieve or bubble cap trays 5. The solution discharges from the sprayer and descends downwardly through the tower in a distributed state over the tower's cross-section. Concurrently, crude vanadium-containing TiCl$_4$ from source 6 ascends as a vapor, from, the bottom of the tower through line 7. As a result, an intimate, direct contact in counter-flow relationship is brought about between the impure TiCl$_4$ vapor and the organic treating agent solution which induces scrubbing and reaction therebetween. The vapor bubbles through a suitable depth of absorbing liquid maintained in the tower. Non-volatile, insoluble vanadium complexes and reaction products formed in the tower are condensed in the liquid phase and pass downwardly for discharge along with the contacting liquid into a separation vessel 8 through line 9. Vanadium-stripped TiCl$_4$ vapor formed rises to the top of the column, is withdrawn through line 10 to a condenser 11 or other desired heat exchange equipment and is then passed, via line 12, into a pure TiCl$_4$ storage tank 13. If desired, portions thereof can be recycled (a) through the valve-controlled line 14 to the mix tank 1 to form additional quantities of organic treating agent solution or (b) through line 21 to supply hot TiCl$_4$ to the tower mixed with treating solution. Thick sludge and thin liquid TiCl$_4$ charged to separation vessel 8 separates the TiCl$_4$ component overflowing through a line 15 into a hold-up tank 16 from whence the TiCl$_4$ can be recycled through the lines 17 and 19 for reuse in the system as a liquid medium for forming the organic treating agent solution employed in the process. The slurry which accumulate in the bottom of vessel 8 may be withdrawn through line 20 either intermittently or continuously and reclaimed by recourse to centrifuging, to leave behind the tar and residues containing vanadium and iron impurities. Pumps 23 and valves 24 are used in the system to control and direct fluid flow. The temperature in tower 3 is continuously monitored by thermocoupler 22.

In practically adapting the invention any conventional type equipment can be employed. This can comprise a system, in combination, of a dissolving tank or other solids-liquid contacting vessel equipped with an agitator or stirrer, a vaporizer, a plate-type column or scrubber, a condenser and a collector or storage vessel. All varities of scrubber may be used such as: (a) Those in which vapor is the continuous phase and dispersed liquid is sprayed or showered down through it; (b) those having liquid as the continuous phase with the vapor rising in dispersed bubbles; (c) fractionating devices such as packed towers, bubble cap columns, etc. The first two (a or b) are preferred since there is less chance for the liquid phase to dry up leaving baked-on organic residues because of local excess of superheated vapor. The second, (b), is especially free of this problem. A liquid phase superheater operating under pressure can be used to provide superheat as a source of hot crude TiCl$_4$ vapor, a chlorination furnace, an iron chloride condenser, a vapor heater, or a re-boiler fitted with vapor heating elements to provide superheat is satisfactory. If the TiCl$_4$ source is a liquid, it can be heated and flashed as superheated liquid TiCl$_4$ through a suitable valve or nozzle into contacting zone. Thus, as illustrated, a liquid absorbing solution can be prepared in the mix tank by mixing at ambient temperature a suitable liquid, such as relatively pure titanium tetrachloride or a relatively high boiling organic material, such as a chlorinated hydrocarbon (dichlorobenzene, chlorotoluene, chloronaphthalene, etc.) with sufficient organic treating agent to reach completely in the presence of an excess of said liquid with the VOCl$_3$ or VCl$_4$ impurity present in the crude TiCl$_4$ subjected to treatment with the absorbing solution. Usually the amount of organic treating agent or mixture employed ranges from about .05 to 5% by weight but if desired such amount may range up to 10% by weight. Preferably, the organic treating agent used comprises dry, powdered laundry soap or similar soap product resulting from the saponification or neutralization of fats, oils, waxes, rosins or their acids, with an organic or inorganic base. Particularly adapted for use are the sodium salts of hydrolyzed naturally-occurring fatty acid triglycerides, and the alkali metal salts of such fatty acids as stearic, oleic, palmitic, e.g., sodium stearate, potassium oleate, sodium palmitate, etc. Alternatively, various polymers, such as polyethylene, and various vegetable and mineral oils, such as cotton seed or tall oil, lubricating oil and Bunker "C" oil can be utilized.

EXAMPLE 1

Employing an apparatus such as shown in the accompanying drawing, crude titanium tetrachloride vapor containing as impurities ferric chloride, vanadium oxychloride and other indigenous chlorides and noncondensable gases obtained from the direct chlorination in a furnace charged with coke and rutile ilmenite ore, was cooled to about 350° C. by injecting liquid TiCl$_4$ and passed upwardly through a 14-foot high scrubbing tower equipped with 6 dual-flow perforated trays spaced 2 feet apart. Each tray was covered with approximately 2 inches of a circulating scrubbing liquid at the equilibrium temperature of the rising TiCl$_4$ vapor. This scrubbing liquid contained approximately 0.3% commercial laundry soap dissolved in TiCl$_4$ and was circulated to the column at a rate which held the temperature of the liquid in the bottom of the column at the equilibrium value. In this instance the equilibrium temperature was near the normal boiling point of TiCl$_4$ due to two opposing factors, namely the presence of non-condensable gases in the crude vapor which tends to lower the temperature, and the somewhat elevated operating pressure at the foot of the column which raises the temperature. A marked rise in the temperature at the thermocouple 22 indicates that the superheat in the crude vapor is drying up the liquid in the column and signals for increasing the liquid feed rate. The soap was incorporated in the TiCl$_4$ in the mixing tank 1 and held therein for at least one minute prior to being overflowed into the hold-up tank 16. The proportion of circulation liquid and makeup liquid was determined by a proper balance of temperature and soap concentration which was such that the scrubbing liquid fed to the column contained approximately 0.3% soap and said liquid was at a temperature of about 100° C. The pure, condensed TiCl$_4$ vapor recovered from this operation was found to be water white and on an analysis contained on an average 5 p.p.m. vanadium.

EXAMPLE 2

When the off gas pressure from the chlorination furnace was not sufficient to force the vapor through the scrubber, crude liquid TiCl$_4$ containing 3500 p.p.m. vanadium and quite free of noncondensable gases and heated under pressure to 150–160° C. was flashed into tower 3 at a pressure of about 4 p.s.i.g. and containing a few degrees of superheat relative to the normal boiling point of TiCl$_4$. Simultaneously, a relatively smaller amount of hot purified TiCl$_4$ at approximately 130° C. was drawn through line 21 and mixed with concentrated soap-TiCl$_4$ solution from line 2 just prior to entry into the top of the scrubbing tower. By using the hot pure TiCl$_4$ to raise the temperature of the treating agent liquid, a minimum of superheat in the vapor was required. The crude vapor rising against the scrubbing action of the liquid agent was purified so that the recovered vapor condensed in 13 was below 5 p.p.m. vanadium and colorless. Relative flows of liquid and vapor in the scrubbing column were controlled as before to keep adequate liquid contact in the column and maintain the equilibrium temperature which was close to 136° C. The heat available at 4 p.s.i.g. and released to the liquid phase as it rises to atmospheric pressure at the top of the column is sufficient to maintain the equilibrium operating temperature.

Although specific methods, temperatures, reagents and apparatus have been described for purifying crude vanadium-containing TiCl$_4$ vapor by passing it upwardly through a descending, cascading relatively concentrated soap-TiCl$_4$ liquid with sparging of the vapors through a depth of the liquid retained on plates in a scrubbing column, the invention is not limited thereto. In general, use is contemplated of various, known organic treating agents or mixtures which react with and remove vanadium compounds such as VOCl$_3$ or VCl$_4$ from TiCl$_4$. Soap employment and treatment is especially preferred, particularly the alkali metal salts of high molecular weight fatty acids such as those of stearic, myristic, palmitic, oleic and lauric acids, or mixtures obtained by reacting an alkali metal hydroxide with an animal or vegetable fat. As noted above, use is contemplated of a wide variety of organic treating agents, or mixtures, in addition to soap. These include mineral oil, polyethylene, tall oil, vegetable oil, etc. which are suitable as complexing agents for the undesired vanadium compound impurity. These can be generally classified as fats, esters, modified fats, resins, polymers, tars, carbonyls, petroleum oils, chlorinated hydrocarbons, paraffins, petroleum residues and the like. These materials are effective in concentrations of from 0.03 to 10% by weight in the scrubbing liquid. The structural feature necessary in the molecules of useful organic treating agents is chains of —(CH$_2$)— groups. Those containing at least 5-(CH$_2$)-(CH$_2$)-groups per molecule are preferred for use. Such compounds including linear and branched-chained aliphatic hydrocarbons, whether saturated, unsaturated or polyunsaturated, fatty acids, fatty alcohols and their derivatives, and polyolefins. These agents are already known in this field and the foregoing description of them may be understood as defining the term "organic treating agents."

If desired, the liquid contacting solution can be heated to near the boiling point, for example about 130° C. as it is fed to the column. The impure vapor under treatment will then come into contact with the liquid and establish thermal equilibrium with a minimum of condensation. Use is made of the heat content of the incoming impure vapor to bring the mixture to the equilibrium temperature and the temperature and quantity of the circulating slurry is adjusted accordingly to provide the desired thermal balance at the equilibrium temperature. Scrubbed liquids may be circulated for treatment of the vapor until its capacity for vanadium absorption becomes exhausted, whereupon it is replaced by a fresh treating slurry. Continuous operations can be undertaken where a fraction of the treating solution is bled off to a holding tank and replaced by a like amount of fresh soap solution at the mixing vessel.

The present invention provides a novel and effective method for purifying vaporous TiCl$_4$ to remove impurities present predominantly in the form of vanadium oxychloride and tetrachloride. Advantageously it eliminates the fouling of the surfaces of purification vessels with sludges containing vanadium-organic polymerization products, and avoids the handling problems which the presence of such sludges entails and provides a continuous method for removing vanadium containing organic sludges from the operating equipment.

As indicated, the liquid stream is preferably fed to the contacting vessel below the boiling point of TiCl$_4$ and emerges from the column at substantially the dew point of the entering vaporous, contaminated TiCl$_4$. The temperature of the contacting scrubbing liquid obviously will depend upon the temperature of the TiCl$_4$ vapor and the latter stream can be charged to the column at any desired temperature above the boiling point of TiCl$_4$ for emergence therefrom at a lower temperature.

The heat content of the impure vapor is available for heating the reaction mixture in several ways. It may be present as true superheat which is transferred to the liquid on contact. In another instance, as in Example 2, the heat available from the vapor as it expands due to decreasing pressure will suffice; its heat of condensation may also be employed wherein the condensation of a relatively very small amount of vapor will raise the liquid temperature several degrees. In the last two instances it is preferable to feed the liquid treating agent into the reactor hot so that the equilibrium temperature may be reached and maintained with a minimum of vapor condensation.

An outstanding improvement afforded by the present invention is the elimination of heating surfaces in contact with a vanadium-containing sludge. By scrubbing vanadium compounds from titanium tetrachloride vapor in the manner herein contemplated, one circumvents and precludes the heating of vanadium sludge-containing liquids by means of solid heating elements which in time fouls heat transfer surfaces and to an extent such that the equipment becomes a poor conductor of heat to require shutdown for cleaning.

In addition, process economics are improved since the use of expensive inorganic purifying reagents is dispensed with. Organic material advantageously provides a large number of compounds which can be chosen for use. Hence, this improved operation based upon use of organic purifying agents is most preferred because of the flexibility it enjoys with respect to the availability and cost of these agents.

Most previously known purification methods are directed toward removing vanadium from crude TiCl$_4$ which is relatively pure in the sense that the majority of the impurities has already been removed through the condensation and distillation steps. Furthermore, the vanadium treatment has always been carried out in a separate step in the production of titanium tetrachloride.

This separate step involves the condensation of TiCl₄ vapor from the first rectification step, the liquid phase treatment with agents and a second revaporization. Since the removal of vanadium from the initial crude vapor stream is afforded herein by eliminating condenser and revaporization steps, considerable savings on investment as well as operating costs can result.

Many equivalent modifications of this invention will become apparent to those skilled in the art from a reading of the above without a departure from the inventive concept.

What is claimed is:

1. A process for purifying crude vanadium-containing titanium tetrachloride wherein ascending crude titanium tetrachloride vapor is counter-currently contacted in the contact zone of a vertically disposed column at the liquid-vapor equilibrium temperature, with an organic treating agent dissolved in descending liquid titanium tetrachloride spray, and a non-volatile complex of said vanadium and said organic treating agent forms and is removed from said column without fouling said column, and purified titanium tetrachloride vapor is removed from above the said zone, the improvement which comprises establishing and maintaining said equilibrium temperature in said zone solely by means of heat derived from said crude vanadium-containing vapor and said liquid titanium tetrachloride containing said treating agent and in the absence of heating from heating surfaces.

2. The process of claim 1 wherein the said impure titanium tetrachloride vapor is supplied with superheat to establish and maintain the said equilibrium temperature.

3. The process of claim 1 wherein the said liquid organic treating agent is an alkali metal stearate dissolved in liquid titanium tetrachloride.

4. The process of claim 3 wherein the said metal stearate is present in the said liquid treating agent in an amount of from 0.03 to 10% by weight.

5. The process of claim 4 wherein the said equilibrium temperature is about 130 to 136° C.

References Cited

UNITED STATES PATENTS

| | | | |
|---|---|---|---|
| 2,224,061 | 12/1940 | Pechukas | 23—87 |
| 2,412,349 | 12/1946 | Meyers | 23—87 |
| 2,592,021 | 4/1952 | Frey et al. | 3—87 |
| 2,614,028 | 10/1952 | Schaumann | 23—87 |
| 2,920,016 | 1/1960 | Sharr et al. | 23—87 XR |
| 3,102,785 | 9/1963 | Bristow | 23—87 |
| 3,156,630 | 11/1964 | Fahnoe et al. | 23—87 |

EDWARD STERN, Primary Examiner

U.S. Cl. X.R.

202—57